Figure 1:
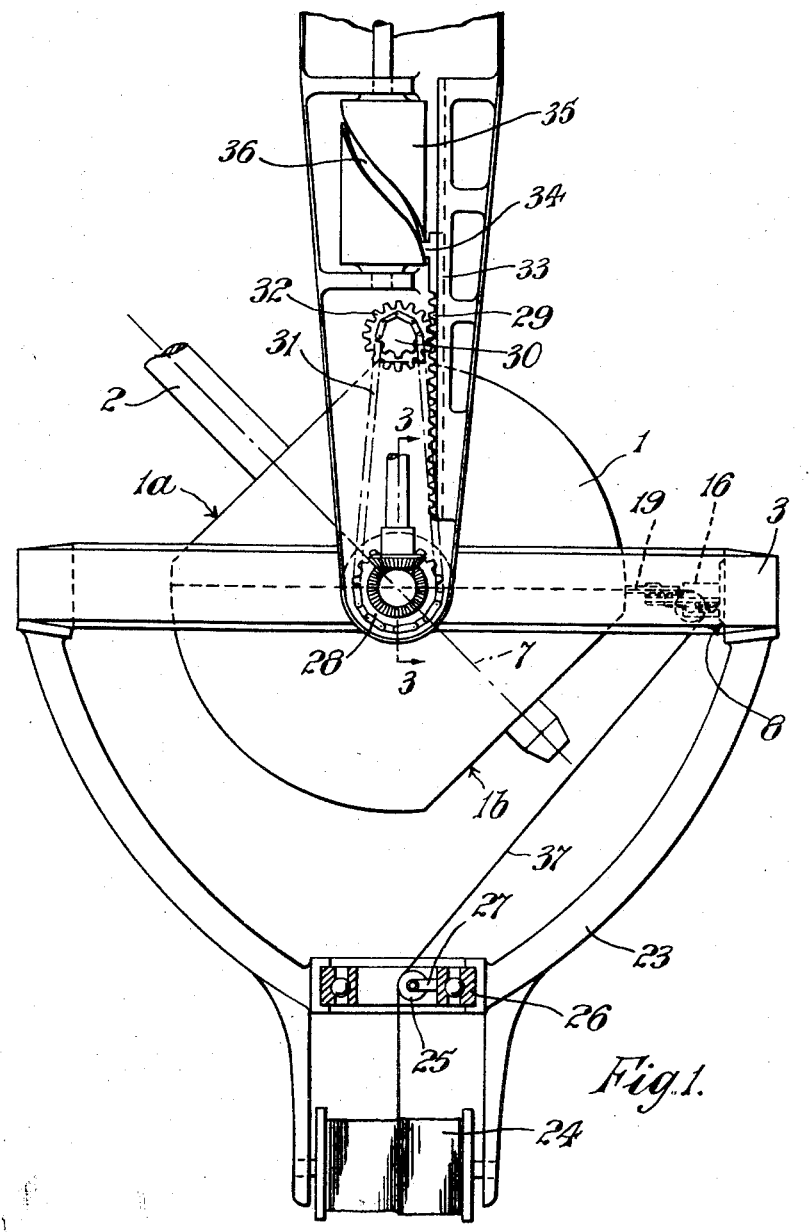

United States Patent Office 2,855,158
Patented Oct. 7, 1958

2,855,158

APPARATUS FOR THE MANUFACTURE OF PNEUMATIC TYRES

Howard Francis Pumphrey, Solihull, and Anthony David Gatling, Fisherwick, near Lichfield, England, assignors to Dunlop Rubber Company Limited, London County, England, a British company Application January 7, 1957, Serial No. 632,924

Claims priority, application Great Britain January 13, 1956

7 Claims. (Cl. 242—2)

This invention relates to apparatus for the manufacture of pneumatic tyres and more particularly relates to apparatus for winding pneumatic tyres and reinforcements therefor such as are disclosed in our co-pending applications Serial No. 491,295 filed March 1, 1955 and Serial No. 518,518 filed June 28, 1955.

In our co-pending applications said application Serial No. 491,295 a pneumatic tyre is described having a carcass reinforcement comprising a winding of cord arranged in the form of at least one double layer in which the cord of one layer crosses the cord of the other layer to form a lattice and the cord in each layer extends in a series of unit waves progressing continuously around the tyre in the same direction, each wave consisting of two substantially diagonally opposite arcuate portions, each extending round one edge of the tyre, alternating with oblique portions passing through the side walls and crown of the tyre which leave and approach the edges substantially tangentially.

Also, in our co-pending application Serial No. 518,518 a tyre reinforcement is described which comprises a band formed from convolutions of a cord or cords progressively wound obliquely from one side of the band to the other in zig-zag formation, the cord or cords being substantially uniformly distributed around the band and the finished band having at any transverse cross-section an inner surface of parallel lengths of the cord or cords lying obliquely and in an opposed direction to adjacent superposed parallel lengths of cord or cords forming an outer surface.

It will be noted that the tyre reinforcements referred to in the preceding paragraphs are of the type in which a length or lengths of cord are wound in zig-zag formation from one side of the reinforcement to the other.

Our invention provides an apparatus for winding pneumatic tyre carcasses or reinforcements therefor of the type referred to in the preceding paragraph.

According to the invention apparatus for the production from filamentary material of windings of the type referred to comprises a rotatable former having an outer peripheral winding surface, a housing having an annular track surrounding said former, said housing being so mounted relative to the former that a diametral axis of the annular track passes through the axis of rotation of the former and is disposed at right angles thereto and the median plane containing a circumference of the track and the said diametral axis is inclined at an acute angle to the said axis of rotation, a carriage constrained by said track to run in an annular path, a guide for the filamentary material mounted on said carriage, means for rotating the former and means for driving the carriage around the track, at such relative speeds that a progressive winding can be formed having convolutions which are slightly displaced and symmetrically distributed around the finished winding.

Means may be provided for rotating the housing about the said diametral axis of the annular track into various positions in order to adjust the angle of inclination of the said median plane relative to the rotational axis of the former so that various widths of winding are obtainable.

Moreover, means may be provided for reciprocating the housing about the said diametral axis a predetermined number of times at a speed relative to the speed of rotation of the former whereby during the passage of the carriage around the track, oblique lengths of material forming the winding may be laid on the winding surface a predetermined number of times from one side of the winding surface to the other and back again and along predetermined, i. e., straight or curved or partially curved, paths, for example, partially or wholly cycloidal or sinusoidal paths. The number of complete movements of the housing from one inclination to an opposite inclination for each substantially complete rotation of the carriage around the track, is a whole number and preferably an even number, the value of the whole or even number varying according to the winding it is desired to produce.

Guiding means, additional to that mounted on the carriage, may be provided for guiding the filamentary material from a source of supply to the carriage guide.

In one construction the carriage is rigidly attached to a ring located co-axially in said annular track, the ring being provided, on one side, with a plurality of gear teeth, which engage with a driving pinion, and being rotatably borne in said track upon a plurality of rollers disposed round the track.

Figure 2:
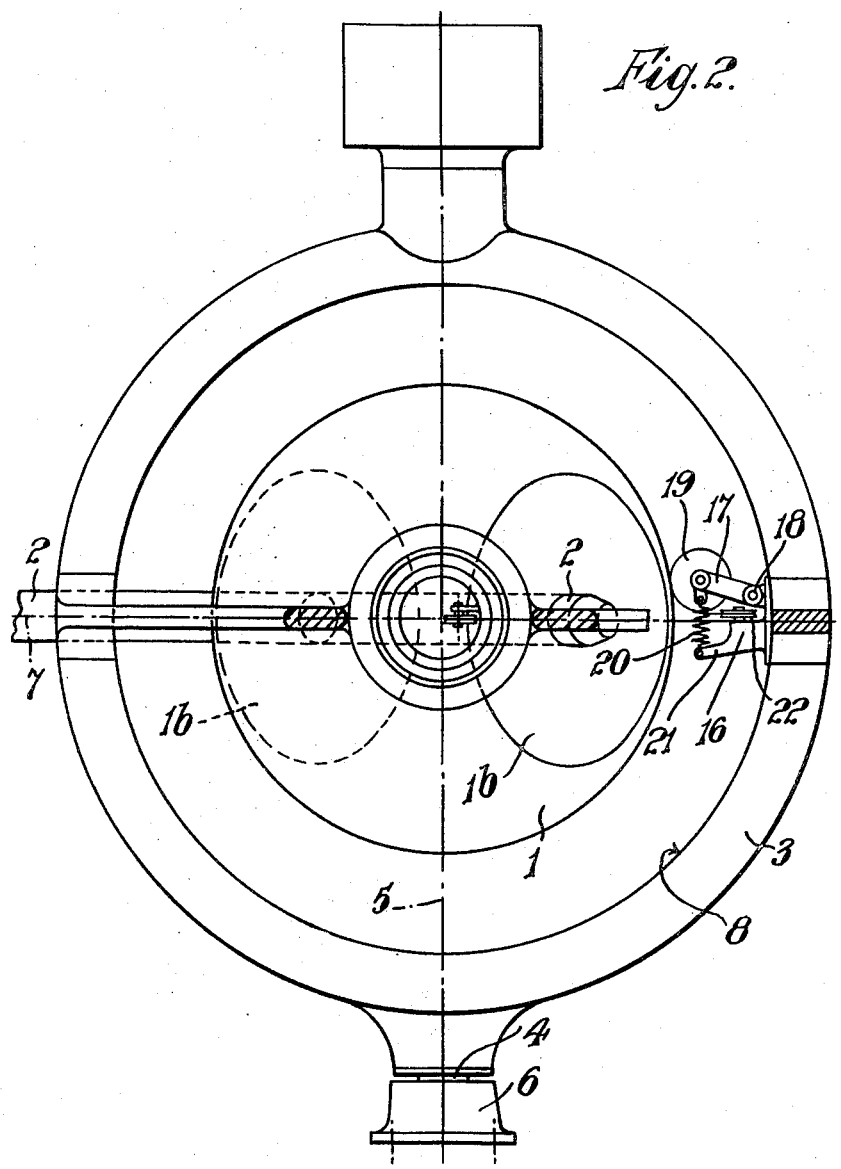
Figure 3:
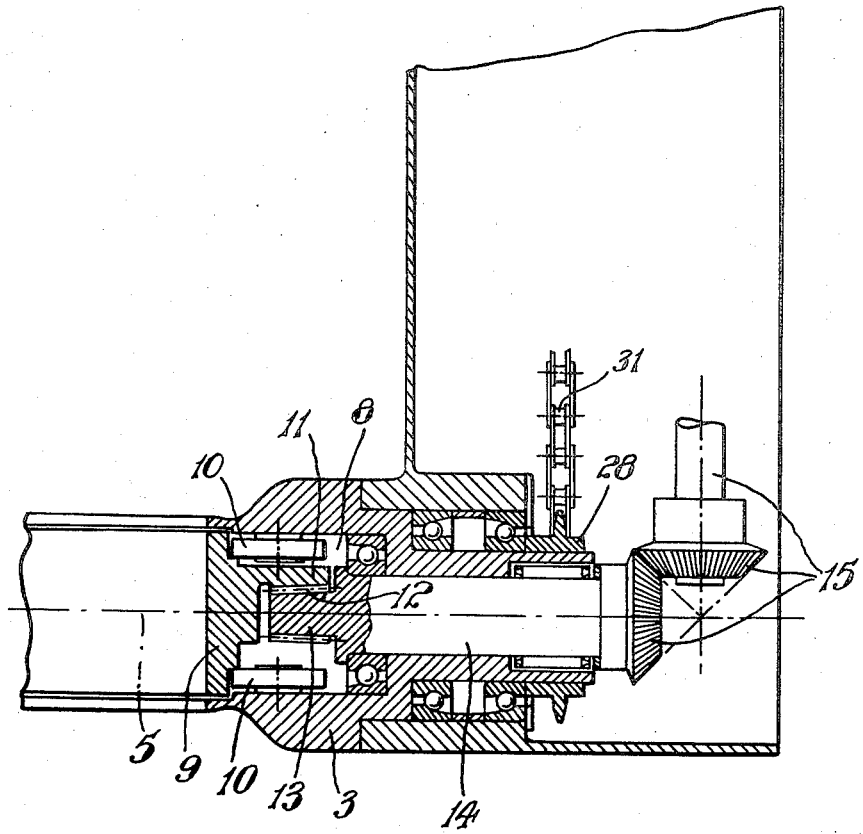

One embodiment of the invention will now be described, which is suitable for winding pneumatic tyres of the type described in our co-pending application Serial No. 492,792, filed March 1, 1955, with reference to the accompanying drawings in which Figure 1 is a plan view of apparatus according to the invention Figure 2 is an end elevational view of the apparatus shown in Figure 1 with a part cut away, and Figure 3 is a cross-sectional view of part of the apparatus shown in the above figures taken along the line 3—3 of Figure 1.

A winding former 1 having a substantially spherical winding surface has diametrically opposite ends 1a and 1b truncated and is mounted horizontally on a shaft 2 which is secured to the former co-axially with the truncated ends.

The former is collapsible so that a wound carcass may be removed from the winding surface, and to this end, the winding surface is formed on a plurality of segments detachably attached to end plates by means of bolts.

An electric motor and a high-ratio gearing mechanism (not illustrated) is provided for driving the former shaft 2 at slow speed. An annular housing 3 surrounds the former and is mounted upon a shaft 4 which extends from the outer periphery of the housing, along a diametral axis 5. This shaft is supported in a bearing mounted in a casing 6 disposed vertically beneath the former in such a position that the said diametral axis of the housing passes through the axis of rotation 7 of the former and is disposed at right angles thereto.

The housing 3 is provided symmetrically on its inner periphery with an annular track 8. A rotatable ring 9 is located co-axially in the annular track by means of a plurality of rollers 10 disposed around the track so as to limit the axial and radial movement of the ring and thereby constrain the ring so that it is freely rotatable within the track (see Figure 3). A radially extending face 11 of the ring is provided with a plurality of bevel gear teeth 12 which engage with a bevel pinion 13 mounted on a shaft 14 which extends radially outwardly of the housing on the diametral axis 5 upon which the housing shaft is mounted, the said bevel pinion shaft being driven by a gear train and shafts 15 directly connected to the electric motor provided for driving the former. The ratio of the gear train is such that the ring is capable of being rotated for a predetermined number of revolutions for each revolution of the former.

A carriage 16 is rigidly attached to the ring 9 on its inner periphery, the carriage having an arm 17 pivotally mounted thereon on a pin 18 having its axis parallel to the axis of the ring with which the carriage rotates. A freely rotatable pulley 19, for guiding filamentary material which is being wound onto the former winding surface, is mounted on a free end of the arm. A spring 20 has one end attached to the arm and the other to a bracket 21 on the carriage, the spring serving to urge the guiding pulley into contact with the winding surface on the former. An idling pulley 22 is freely rotatably mounted on the carriage, the axis of rotation of the idling pulley being disposed at right angles to the axis of rotation of the guiding pulley and parallel to the diametral axis 5 of the housing.

A support 23 is provided for a spool 24 of rayon cord to be wound on the former, the support comprising a pair of arms rigidly attached on to each side of the housing. A second freely rotatable idling pulley 25 for guiding filamentary material to be wound is attached by a bracket 27 to the inner race of a bearing 26 mounted between the arms of the support 23, the bracket and pulley being rotatable around the axis of the bearing.

The housing 3 is rotatable around the diametral axis 5 by means of a sprocket 28 rigidly attached to the housing co-axially with the bevelled pinion shaft 14 earlier referred to. A second sprocket 30 is connected by means of a chain 31 to the sprocket 28. The sprocket 30 is rigidly mounted upon a shaft together with a pinion 32. A rack 29 engages the pinion 32, the rack being reciprocably mounted in bearings 33, reciprocation being effected by means of a follower 34 attached to the rack and an associated cam 35 having a grooved track 36 upon its cylindrical outer surface. A motor (not illustrated) is provided for rotating the cam and thus adjusting the angle of inclination of the housing 3 and track 8 relative to the rotational axis 7 of the former 1.

The operation of the apparatus just described will now be outlined.

A thin sheet of unvulcanised rubber is applied to the winding surface of the former 1 and the inclination of the housing 3 and track 8 relative to the rotational axis 7 of the former adjusted so that the desired width of winding is obtainable. In this instance the angle of inclination is set so that a winding covering substantially the whole of the winding surface can be obtained. A winding of this type is described in our co-pending application Serial No. 491,295, filed March 1, 1955.

A length of rayon cord 37 is passed from the spool 24 over the idling pulleys 25 and 22 and the spring-loaded guiding pulley 19 and applied to the sheet of rubber upon the winding surface and adhered in position thereon. The driving motor is started so that the ring 9 carrying the carriage 16 is rotated within the track 8, the former 1 being simultaneously rotated sufficiently so that when the carriage 16 has made a complete rotation around the track to lay a length of cord on the winding surface, the former has rotated so that a second rotation of the carriage will cause a further length of cord to be located alongside the first length. Continuous operation of the apparatus causes a winding of the type described in our co-pending application Serial No. 491,295, filed March 1, 1955 to be formed.

Reinforcements in the form of bands formed from convolutions of a cord or cords as described in our copending application Serial No. 518,518, filed June 28, 1955 may also be wound on apparatus of the kind just described the required width of the band to be wound being obtained by correctly setting the angle of inclination of the housing and track in the manner described.

In order to obtain a band in which the number of the oblique lengths of material passing from one side of the band to the other may be increased or in order to obtain a band in which the lengths are disposed on curved or partially curved paths the apparatus described above may be modified so that instead of separate driving means being provided for the cam, the cam may be directly driven by the motor for driving the ring and former so that the housing is caused to oscillate round the said diametral axis at a constant or a cyclically variable speed during the rotation of the carriage around the former so as to obtain the required cord paths, and the required number of oblique lengths of cord laid upon the winding surface for each substantially complete revolution of the ring.

Although in the apparatus just described the former has a spherical winding surface, other types of former may be provided having cylindrical winding surfaces or winding surfaces which are crowned and other than part-spherically shaped.

In the apparatus just described a ring is provided for driving the carriage around the track. In an alternative construction the carriage is driven around the track by means of a pair of parallel endless chains to which the carriage is attached. The chains are each supported upon a series of idling sprockets mounted around the inner periphery of the housing and are each driven by a driving sprocket directly connected to the main motor.

Furthermore the cam provided for reciprocating the rack to adjust the angular position of the housing may, in an alternative construction, be replaced by an hydraulic piston and cylinder mechanism actuated from a supply of fluid pressure and a suitable controlling means.

Having now described our invention, what we claim is:

1. Apparatus for the production from filamentary material of windings of the type referred to comprising a rotatable former having an outer peripheral winding surface, a housing having an annular track surrounding said former, said housing being so mounted relative to the former that a diametral axis of the annular track passes through the axis of rotation of the former and is disposed at right angles thereto and the median plane containing a circumference of the track and the said diametral axis is inclined at an angle to the said axis of rotation, means for rotating the housing about the said diametral axis of the annular track into various positions in order to adjust the angle of inclination of the said median plane relative to the axis of rotation of the former so that various widths of winding are obtainable, a carriage constrained by said track to run in an annular path, a guide for the filamentary material mounted on said carriage, means for rotating the former and means for driving the carriage around the track, at such relative speeds that a progressive winding can be formed having convolutions which are slightly displaced and symmetrically distributed around the finished winding.

2. Apparatus according to claim 1 wherein means are provided for reciprocably rotating the housing about the said diametral axis a predetermined number of times for each substantially complete rotation of the carriage around the track at a speed relative to the speed of rotation of the former whereby during the passage of the carriage around the track, oblique lengths of material forming the winding may be laid on the winding surface a predetermined number of times from one side of the winding surface to the other and back again along predetermined paths.

3. Apparatus according to claim 1 wherein the means for rotating the housing comprises a cam, a cam follower rigidly connected to a rack and pinion engaging the racks and drivably connected to the housing, and means for rotating the cam.

4. Apparatus according to claim 1 wherein the carriage is rigidly attached to a ring, the said ring being rotatably located co-axially within the track by means of a plurality of rollers disposed around the track and being rotatable in order to drive the carriage around the track by means of a pinion engaging with a plurality of gear teeth formed co-axially around the ring on a radially extending face thereof.

5. Apparatus according to claim 1 wherein a support for a spool of filamentary material is provided, said support being rigidly attached to the housing.

6. Apparatus according to claim 5 wherein a guide for the filamentary material is provided, said guide comprising a freely rotatable pulley mounted on a supporting bracket and the bracket being attached to the inner race of a bearing, the outer race of which is carried by the said support co-axially with the axis around which the carriage rotates.

7. Apparatus according to claim 1 wherein the guide for the filamentary material which is mounted on the carriage comprises a freely rotatable pulley mounted with its axis parallel to the axis around which the carriage rotates upon an arm pivotally mounted on the carriage, spring means being provided to urge the pulley into contact with the former winding surface.

References Cited in the file of this patent

UNITED STATES PATENTS

| | | |
|---|---|---|
| 1,080,683 | Edmonds | Dec. 9, 1913 |
| 2,518,967 | Witt | Aug. 15, 1950 |

FOREIGN PATENTS

| | | |
|---|---|---|
| 16,605 | Great Britain | July 19, 1911 |